UNITED STATES PATENT OFFICE.

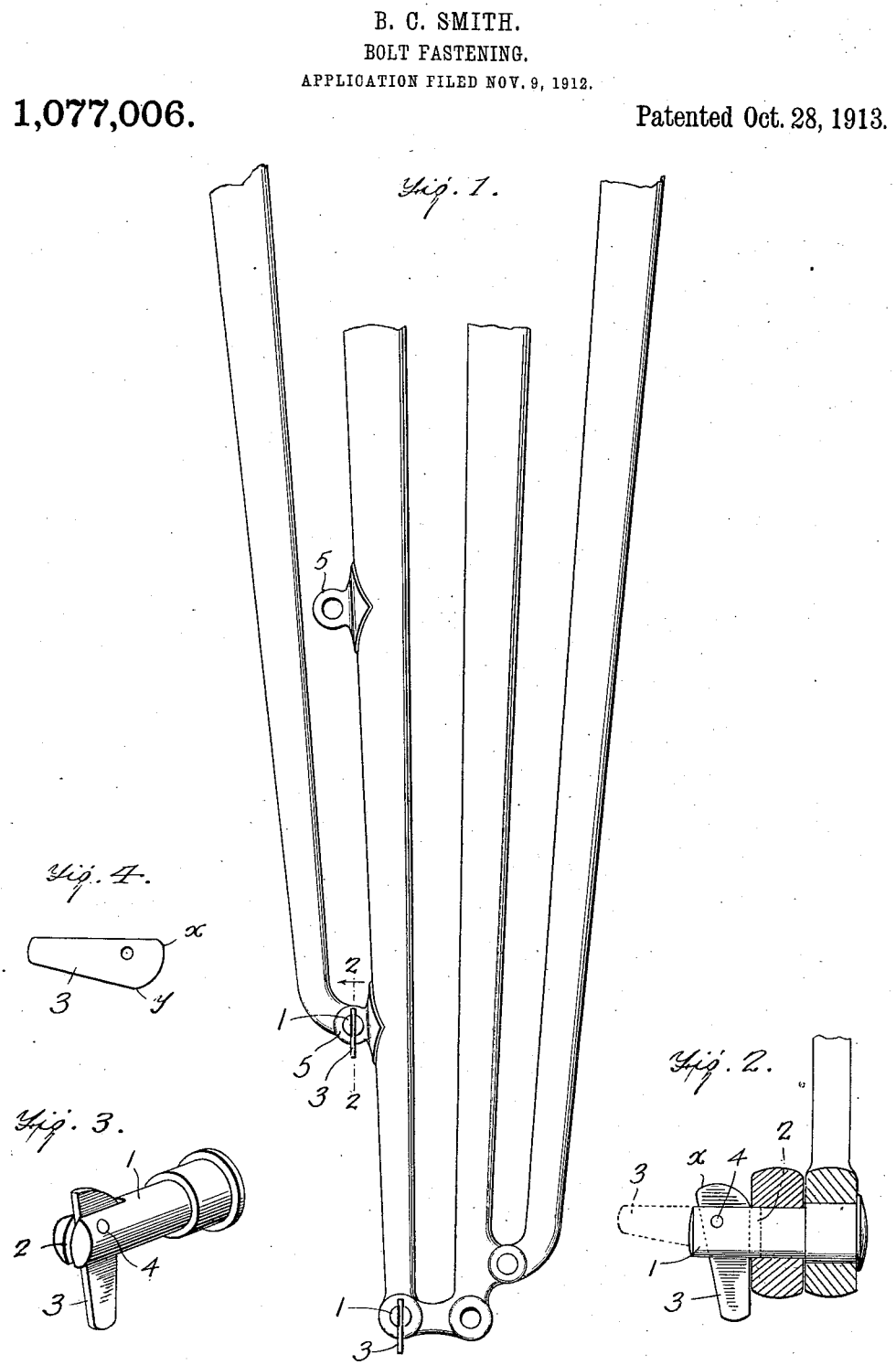

BELDIN C. SMITH, OF DETROIT, MICHIGAN.

BOLT-FASTENING.

1,077,006.  Specification of Letters Patent.  Patented Oct. 28, 1913.

Application filed November 9, 1912. Serial No. 730,386.

*To all whom it may concern:*

Be it known that I, BELDIN C. SMITH, a citizen of the United States, and a resident of Detroit, in the county of Wayne and State of Michigan, have invented an Improvement in Bolt-Fastenings, of which the following is a specification.

My invention is a bolt provided with a lever lock or fastening for use in place of a nut, the same being adapted for general use as a substitute for threaded bolts and nuts and being particularly applicable for securing the bows of automobile tops in such manner that they may be quickly and easily located securely or detached.

The details of construction, arrangement, and combination of parts are as hereinafter described, and illustrated in the accompanying drawing in which—

Figure 1 is a face view showing my invention applied to the bows of an automobile top. Fig. 2 is a transverse section on the line 2—2 of Fig. 1. Fig. 3 is a perspective view of the bolt and fastening device. Fig. 4 is an enlarged side view of the lever fastening detached from the bolt.

The invention is embodied in the threadless bolt 1 having an enlarged flanged head and provided at its smaller end with a central longitudinal slot 2. In this slot, the lever fastening 3 is pivoted eccentrically, that is to say, at one side of the axis of the bolt, by means of a countersunk rivet 4. The fastening is formed of a flat plate which is tapered from one end to the other, the wider end being formed concentrically with the pivot between points $x$ and $y$ and the pivot hole of the plate being located nearer one side than the other. Said plate is thus adapted to swing freely in the bolt slot 2, and when arranged in alinement with the bolt, it is apparent that the latter may be inserted in or detached from an opening in the parts which are to be secured together.

In Fig. 1, I illustrate the bolt and fastening applied to the bows of automobile tops and particularly to brackets 5 forming attachments of such bows. It will be seen that when the lever fastening 3 is turned crosswise of the bolt, as shown in Fig. 2, the inner edge of the plate abuts the adjacent surface of the bracket or other part and prevents accidental detachment of the parts through which the bolt is inserted. In such case, as will be understood from Fig. 2, the shoulder of the lever abuts or rests against the bracket at the edge of the opening. It will be further seen that the eccentric location of the pivot and the concentric form of the adjacent broader end of the plate 3 have such relation to each other that the lever may be turned from the crosswise position into alinement with the bolt, and vice versa, without difficulty, which could not be done if the pivotal arrangement were otherwise effected. In other words, it would require the plate 3 to be pivoted at a point which would leave a space between the plate when adjusted crosswise and the adjacent surface of the parts through which the bolt passes. In this case the lever 3 may be turned into locking engagement crosswise of the bolt so that no slack or space is left between the plate and the adjacent surface and there is hence no end play nor rattling of the bolt.

In order to release the fastening, the longer arm of the lever is pulled outward until the lever is in alinement with the bolt.

I thus provide a bolt fastening which enables a bolt to be easily and quickly applied or detached and which holds the bolt securely, and is inexpensive in manufacture.

What I claim is:—

The combination with parts to be secured together and having coincident bolt holes, of a bolt fastening comprising a bolt having a lengthwise slot at one end, a lever pivoted in such slot at a point located laterally from the longer axis of both bolt and plate and having its pivot end rounded concentrically with the pivot between points $x$ and $y$, so that the lever may be turned crosswise of the bolt after the insertion of the latter through the parts to be secured together and the inner edge of the lever will then lie in contact with the adjacent surface on both sides of the bolt hole, as described.

BELDIN C. SMITH.

Witnesses:
ELMER B. MERKER,
DAVID HORVITZ.

Copies of this patent may be obtained for five cents each, by addressing the "Commissioner of Patents, Washington, D. C."